J. C. LINCOLN.
ALTERNATING CURRENT MOTOR STARTER.
APPLICATION FILED DEC. 20, 1913.
1,163,424.
Patented Dec. 7, 1915.
5 SHEETS—SHEET 4.
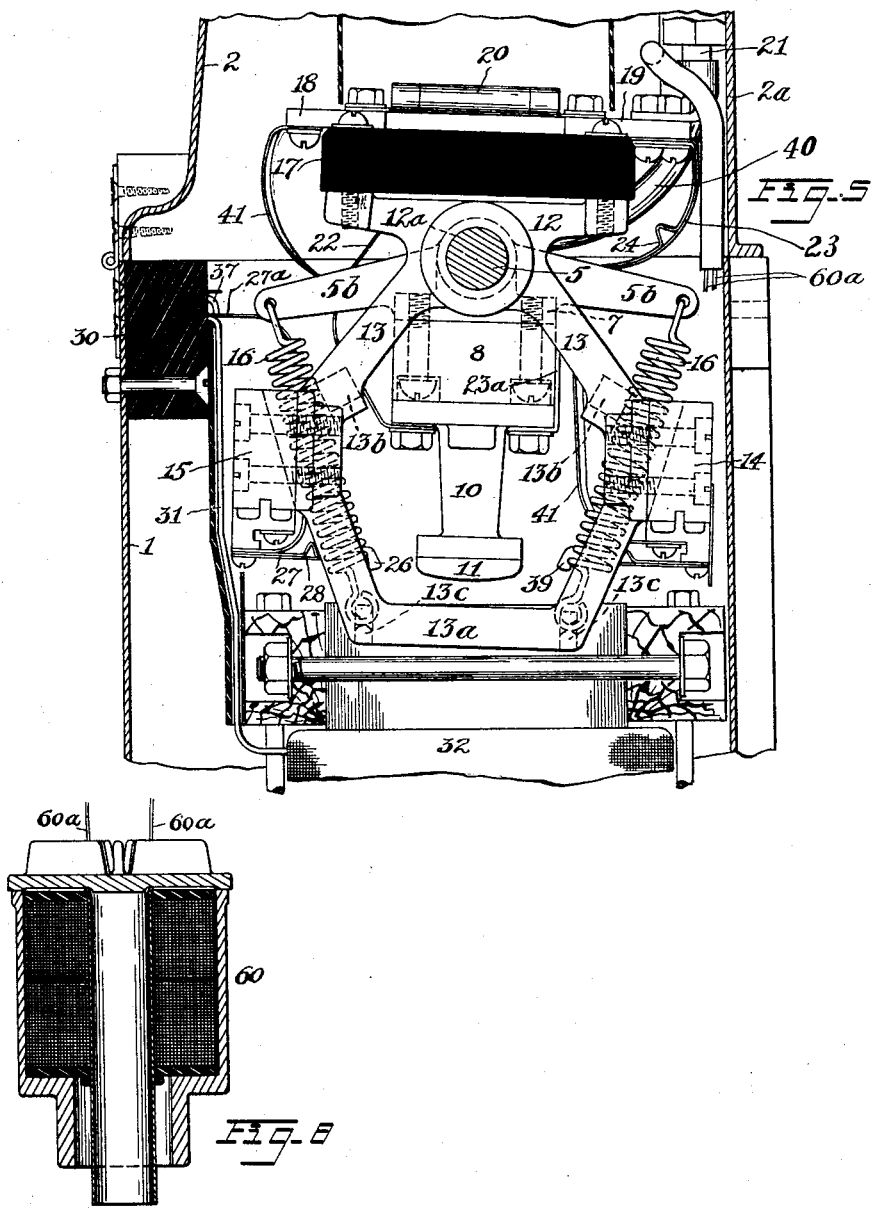

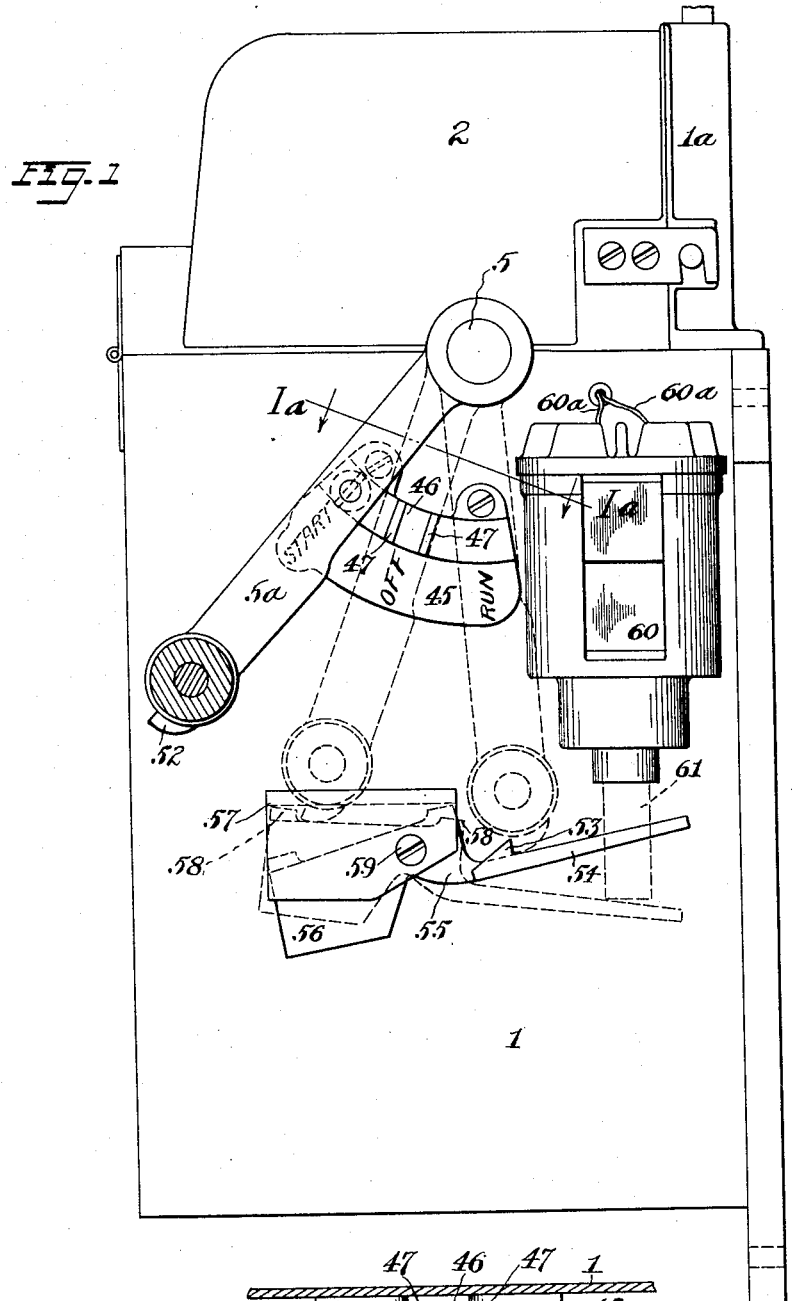

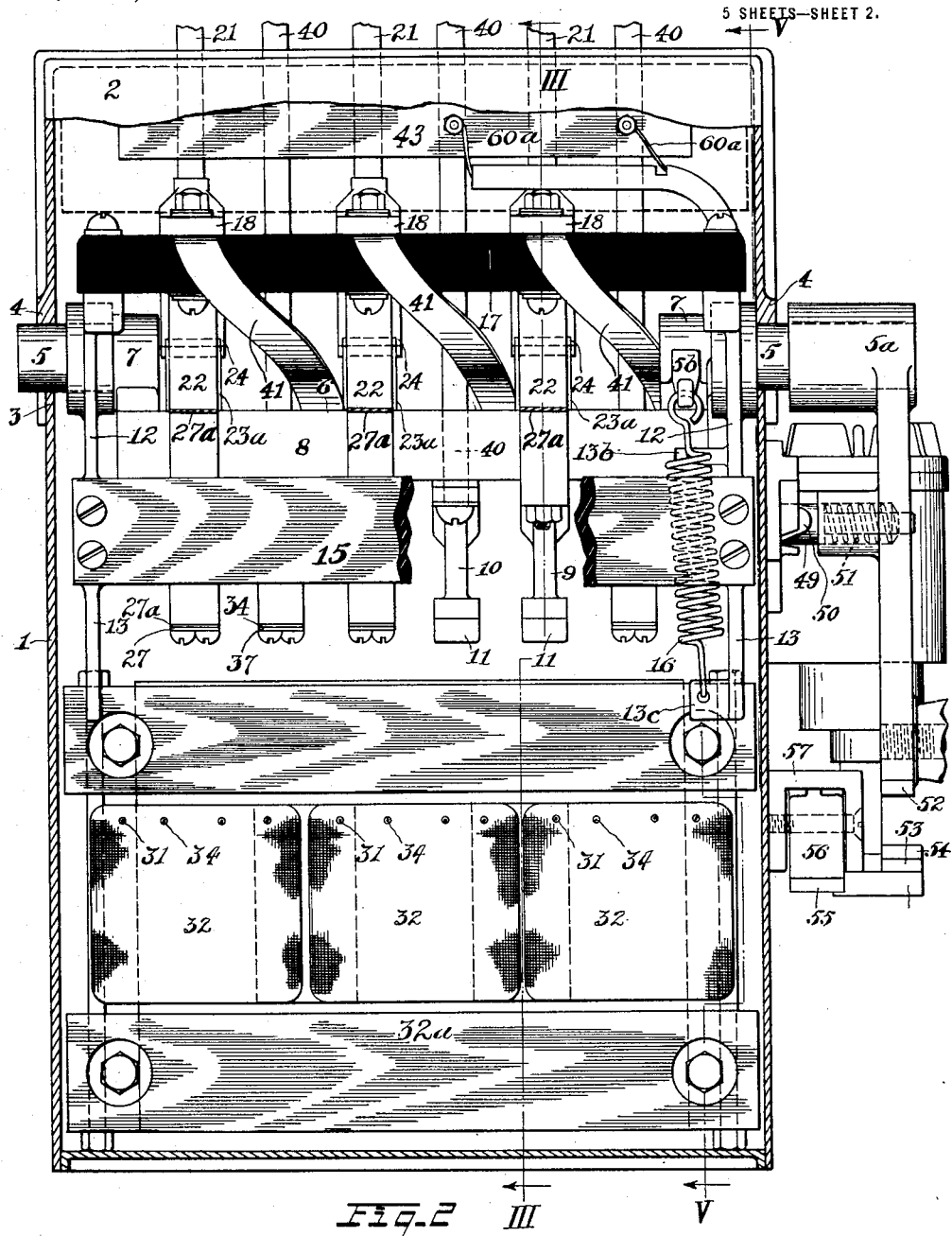

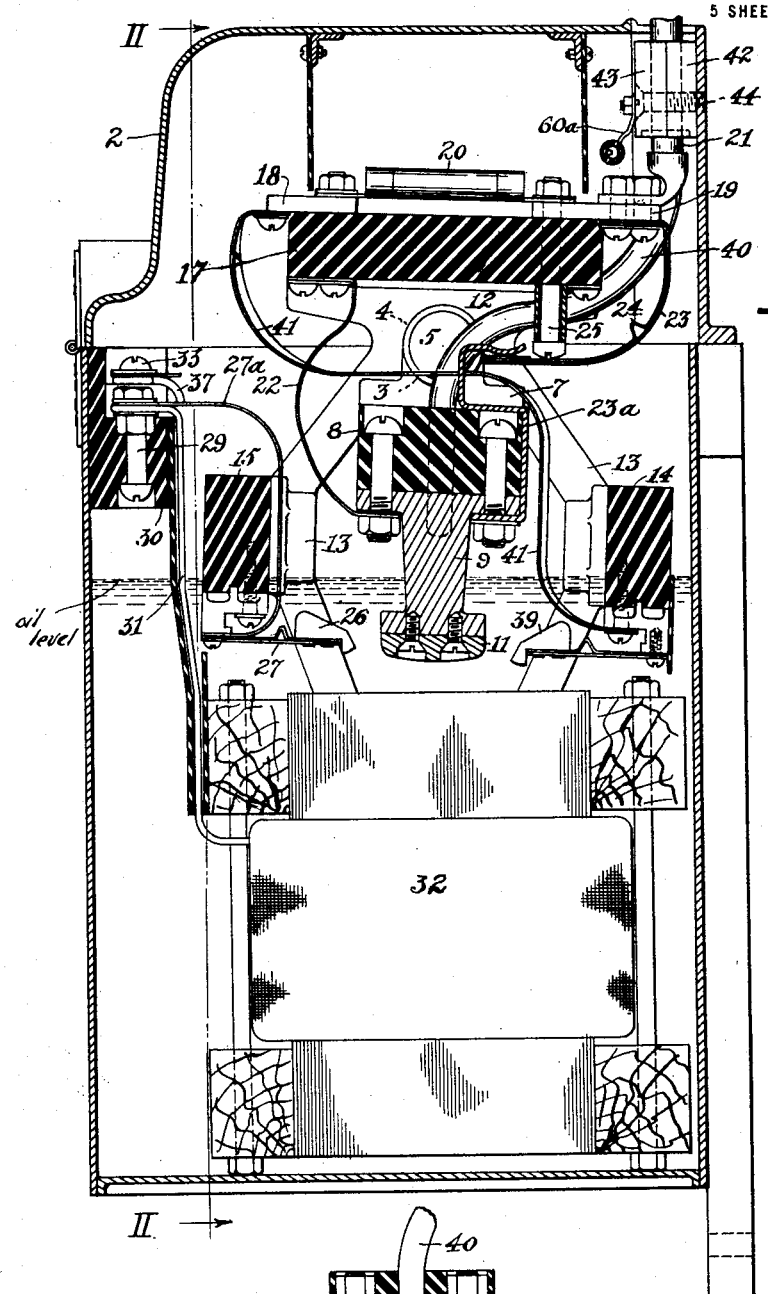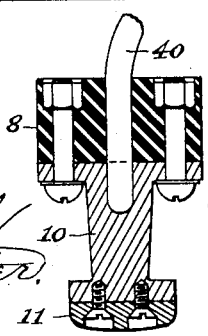

J. C. LINCOLN.
ALTERNATING CURRENT MOTOR STARTER.
APPLICATION FILED DEC. 20, 1913.
1,163,424.
Patented Dec. 7, 1915.
5 SHEETS—SHEET 5.
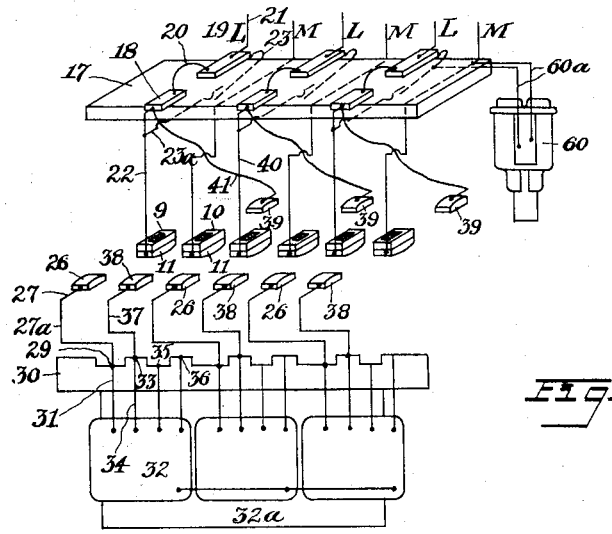
FIG-6
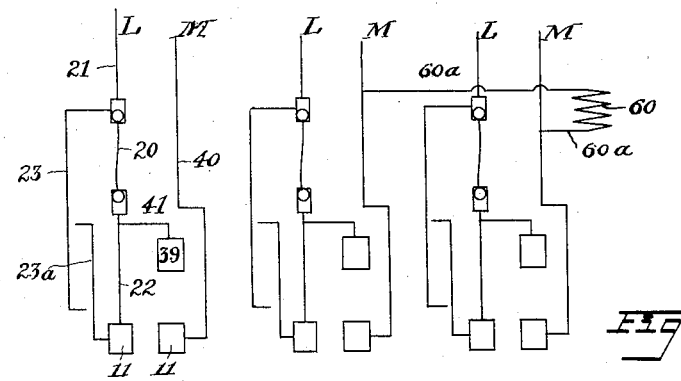
FIG-7
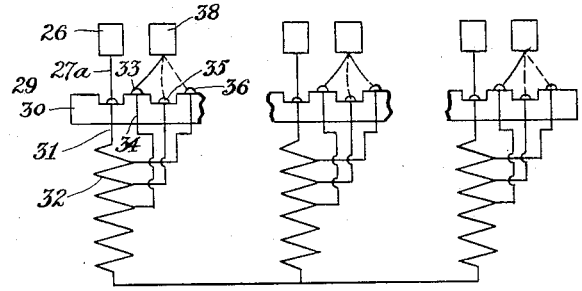
Witnesses:
Sherman Earle
Nathan F. Fritter
Inventor:
John C. Lincoln,
By C. E. Merkel,
his Attorney

UNITED STATES PATENT OFFICE.

JOHN C. LINCOLN, OF CLEVELAND, OHIO, ASSIGNOR TO THE LINCOLN ELECTRIC COMPANY, OF CLEVELAND, OHIO, A CORPORATION OF OHIO.

ALTERNATING-CURRENT-MOTOR STARTER.

1,163,424.  Specification of Letters Patent.  Patented Dec. 7, 1915.

Application filed December 20, 1913. Serial No. 807,987.

*To all whom it may concern:*

Be it known that I, JOHN C. LINCOLN, a citizen of the United States, resident of Cleveland, county of Cuyahoga, and State of Ohio, have invented a new and useful Improvement in Alternating-Current-Motor Starters, of which the following is a specification, the principle of the invention being herein explained and the best mode in which I have contemplated applying that principle, so as to distinguish it from other inventions.

My invention relates to starting devices of the auto-transformer type for alternating current motors.

The object of said invention is to provide a starting device of the above mentioned type which will present certain advantages in its construction and operation, not heretofore embodied in this class of devices insofar as I am aware, and which will contribute to the economy of manufacture and efficiency of operation thereof.

The said invention consists of means hereinafter fully described and particularly set forth in the claims.

The annexed drawings and the following description set forth in detail certain means embodying my invention, the disclosed means, however, constituting but one of various mechanical forms in which the principle of the invention may be applied.

In said annexed drawings:—Figure 1 represents a side elevation of a complete starting device embodying my invention. Fig. 1ª represents a horizontal section of a detail part thereof. Fig. 2 represents a vertical longitudinal section of the inclosing casing and the transformer in the bottom of same, showing the remainder of the contained mechanism and parts in front elevation therein, said section being taken upon the plane indicated by line II—II, Fig. 3. Fig. 3 represents a vertical transverse section of the device taken upon the plane indicated by line III—III in Fig. 2. Fig. 4 represents a vertical section of a detail part of the movable switch-member. Fig. 5 represents a vertical transverse section of a fragmentary part of the casing showing contained parts in end elevation therein, taken upon the plane indicated by line V—V, Fig. 2. Fig. 6 is a perspective diagram of the circuits in the device. Fig. 7 is a diagram of the circuit shown in place. Fig. 8 represents an axial section of the coil used for operating the automatic release core.

The illustrated embodiment of my invention is adapted for use in connection with a three-phase motor current, and includes in its structure the outer casing consisting of the main casing-member 1 and the top or cover-member 2 which is detachably secured in any suitable manner to said member 1. The contiguous edge portion of said two members are formed with the bearing portions 3 and 4 respectively, Fig. 2, which together form bearings for stub-axles 5, 5, which support the oscillatory switch-member 6. These stub-axles form an integral part of two brackets 7, 7, respectively, to the lower surface of which is secured a wooden bar 8, and to the lower surface of the latter are secured three downwardly projecting cast-iron fingers 9 and three bronze fingers 10, the fingers 9 alternating with the fingers 10. The lower extremity of each of the fingers 9 and 10 is provided with a copper contact-piece 11.

The stub-axles 5, brackets 7, bar 8, fingers 9 and 10 and contact-piece 11, together form the switch-member 6. Mounted upon each stub-axle 5, 5, intermediately of the corresponding bracket 7 and the adjacent wall of the casing member 1 is a cast-iron frame-piece, 12, 12, formed with two downwardly extending members, 13, 13. To the two rear members 13, is secured a wooden bar 14 and to the two front members 13, is secured a second wooden bar 15, Figs. 2, 3 and 5. The lower ends of said members of each frame-piece are joined by a cross-piece 13ª for imparting rigidity thereto. The lower end of the right-hand frame-piece is formed with two inwardly projecting lugs 13ᶜ, 13ᶜ, Figs. 2 and 5. The right-hand bracket 7 is formed with two radially extending arms 5ᵇ, 5ᵇ, one extending forwardly and the other rearwardly, Fig. 5, to which are respectively secured the upper ends of two coil-springs 16, 16, whose lower ends are respectively secured to the lugs 13ᶜ, 13ᶜ, Fig. 2.

The frame-pieces 12, 12, are rigidly secured in the casing, as will be hereinafter described, and are each formed with a cylindrical bearing 12ª, through which the stub-axles pass and in which they may freely oscillate. The two springs tend to impart to the switch-member 6 a position in which the fingers 9 and 10 lie substantially midway between the two bars 14 and 15, as shown in Figs. 3 and 5.

To the outer end of the right-hand stub-axle which extends some distance beyond and outside the casing, is rigidly secured an operating handle 5ª, by means of which the switch-member 6 may be oscillated to swing the fingers 9 and 10 forwardly or backwardly, the amount of such oscillation being limited by two stops 13ᵇ, 13ᵇ, formed on the right-hand frame-piece 12, and shown in dotted lines in Fig. 5.

Rigidly secured to the top of the frame-pieces 12 is a longitudinally extending plate 17 of insulating material, preferably of slate, on the top of which are secured three pairs of copper connecting-plates, each pair consisting of a plate 18 located in the front and a plate 19 located at the rear of said plate 17, as shown in Figs. 3 and 5. Each of these plates 18 is connected to the corresponding plate 19 by a fuse 20, and each rear plate 19 has connected therewith one of the three main leads 21, connected with the source of current-supply. The pairs of plates 18 and 19 are in the same vertical plane with the iron fingers 9 respectively, and the front plates 18 are connected therewith by means of the flexible copper conducting-strips 22, as shown in Figs. 2 and 3. The rear plates 19 are each connected with one of three flexible copper conducting-strips 23. Each of these conductor-strips 23 is laid upon the concave side of a spring-steel band 24 whose upper end, with the upper end of the conductor-strip 23, is secured upon the lower surface of plate 19. The lower end of each strip 23 is detached and the steel bands 24 hold them in engagement with the ends of studs 25 secured to and projecting from the slate plate 17, when the fingers 9 and 10 occupy the previously-described median or normal position with reference to bars 14 and 15.

The lower and detached end of each strip 23 is normally in contact with one of three conducting strips 23ª mounted upon the bar 8, Fig. 3, which are also connected with the fingers 9 respectively, and hence with the contact pieces 11, as shown in Fig. 6.

Mounted upon the lower surface of the bar 15 are three copper contact-pieces 26. Each such contact-piece is mounted upon a copper conductor 27 lying against a spring-steel strip 28 provided for imparting resiliency thereto, and lies in the path of oscillation of the contact-pieces 11 which are secured to the fingers 9. The conductors 27 are each connected with a conductor 27ª which is connected with one of three binding-screws 29 mounted upon a wooden supporting-bar 30 secured to the inside of the front wall of the casing-member 1 and adjacent to its upper edge, as shown in Fig. 3. These screws also secure these conductors 27 to conductors 31 which are respectively connected with one terminal of one of three coils 32 of a transformer 32ª. This transformer is of the usual construction, but as illustrated, lies in the bottom of the casing and below the swinging switch-member 6. The other terminal of each coil 32 is connected with one of three binding-screws 33, mounted upon the bar 30, by means of conductors 34.

In the illustrated device, I have shown a transformer each coil of which is provided with three taps, a 50%, a 70% and a 90% tap and I have provided two additional binding screws 35 and 36 on the bar 30 for connecting the 70% and 90% taps respectively, screws 33 being connected with the 50% tap.

One of three copper conductors 37 has one end connected with each binding-screw 33 as shown in Fig. 7, but said ends may be connected with either of the screws 35 or 36 whereby the applied voltage may be varied, as will be understood by those skilled in the art. The other end of each of these conductors 37 is connected with one of three contact-members 38 mounted on bar 15 and which lie respectively in the path of oscillation of the contact members 11 which are secured to the bronze fingers 10. Upon the lower surface of bar 14 are secured three contact-members 39 respectively, also lying in the path of oscillation of said last-mentioned members 11 and mounted in a manner similar to that previously described in connection with members 26.

Passing through bar 8 and having their ends soldered in recesses formed in fingers 10 respectively, are three copper leads 40. Also having one end connected with the front connecting plates 18 respectively are three copper conductor-strips 41, whose other ends are respectively connected with the contact members 39.

Assuming the parts to be in their normal position, that is that position illustrated in the drawing, it will be seen that no current passes through the starter. By now throwing the handle 5ª so as to swing the fingers 9 and 10 to cause contact-members 11 to engage the contact-members 26 and 38, the starting position of the parts is imparted thereto. In this position it will be noted that conductors 23 and 23ª are still in contact, an even better contact having been established since conductor 23 is thus bent out of its normal position, the fuses being short-circuited by the conductors 23 and 23ª. The greater portion of the heavy initial current which flows, passes from the leads 21 into plates 19, conductors 23, conductors 23ª, into and through fingers 9, contact-members 11, into contact-members 26, through conductors 27, 27ª, 31, transformer-coils 32, through conductors 34 and 37, into contact-members 38, 11, fingers 10 and thence through the leads 40 to the motor. The balance of the current passes through the fuses 20, conductors 22, into fingers 9 and from thence follows the just-described path of the major portion of the current.

After the motor has acquired the proper speed, the handle is thrown so as to establish contact between members 11 and members 39. This movement breaks the connection between conductors 23 and 23ª and all of the current now passes through the fuses 20, conductors 41, to contact-members 39, into contact-members 11 which are mounted upon fingers 10, through the latter into leads 40 and thence to the motor.

As will be noted from the above-described construction and arrangement of parts, the frame-members 12 with the attached parts hang upon the stub-axles 5, 5. In order that the mechanism may be properly operated, these members and parts must have proper rigidity. Any suitable means for imparting such rigidity may be employed such as would be suggested to any one skilled in the art. I have found, however, that sufficient rigidity is secured by merely fastening the leads 21 and 40 to the casing. For that purpose two clamping-strips 42 and 43 are provided, Fig. 3. The contiguous faces of these strips are provided with suitable complementary grooves forming channels of proper diameter for receiving and securing these leads. The strips are secured by means of screws 44 passing therethrough and threaded into a part 1ª of the main-member 1 of the casing, extending upwardly from the rear thereof and registering with the cover 2. As shown, the latter is hinged at the front.

By the arrangement and construction of the parts in the manner above-described, whereby the transformer is placed in the bottom of the casing and the switch-member is placed above same, the entire transformer and all of the contact-members 26, 38, 11 and 39 may be entirely immersed in oil, as indicated in Fig. 3. This immersion of the transformer tends to keep it cool and the immersion of the contact-members eliminates largely the deleterious consequences of arcing when the connections are changed, as will be readily understood.

As shown in Figs. 3, 6 and 7, the supporting bar 30 is provided with a succession of recesses forming a series of elevated plane surfaces all located in one horizontal plane and a series of alternately occurring depressed plane surfaces all located in a lower horizontal plane. Binding screws 33 and 36 are mounted upon the elevations and binding screws 35 and 29 are mounted in the depressions. It will therefore be seen that the upper terminal portions of the adjacent taps and the conductors 31 are located in different horizontal planes. This being true a change of connection from one tap to another involves not only a change of the lateral position of the end of conductors 37, but a change in their vertical position as well. This arrangement eliminates to a degree liability of the inadvertent contact of said conductors 37 with the adjacent binding screws to which they are not designedly connected, as will be readily understood by those skilled in the art.

Most motors until recently have been of the direct current type and rheostats have invariably been employed for starting same. In the use of these rheostats deliberation in moving from one contact to another was desirable and the motor-using public has been educated to handle starting apparatus in that way. The tendency to slowly move the movable contact member has therefore become more or less habitual.

In apparatus of the nature of my invention, however, in which a comparatively heavy current is handled, it is desirable in starting, to connect the stationary contact-members with the movable contact-members quickly so as to avoid arcing and consequent destruction of or damage to said members. In order to counteract the tendency, derived either from habit, ignorance or carelessness, of moving the switch-member slowly, I have provided certain mechanism which I shall now describe.

Opposite about the middle of the inner surface of the handle 5ª and suitably secured to the outside of the casing-member 1, is a plate 45 formed with a notch 46 having lateral outwardly inclined faces 47, 47. Projecting from said middle inner surface of the handle is a barrel 48 in which is seated a spring-actuated plunger 49, Fig. 1ª, having a beveled end provided with faces 50, 50, parallel with the sides 47, 47, of the notch 46.

When the switch-member 6 is in its "off" or central position, the handle 5ª is in a position in which the plunger 49 projects into the middle of the notch, as shown in Figs. 1 and 1ª. The width of said notch is such that a given amount of free play of the plunger is permitted laterally therein as shown, for a purpose hereinafter described.

It will be seen from the just-described arrangement that before the handle can be moved to throw the switch-member into "starting" position, sufficient force must be applied to said handle to cause the left-hand inclined faces 47 and 50 to slide upon each other so as to overcome the oppositely directed force exerted by the spring 51 which actuates the plunger. The degree of such required force, it will be seen, depends primarily upon the degree of inclination of said surfaces with reference to the axis of the plunger, and the strength of the spring 51. This inclination and spring-strength are made such that the force required to overcome the static friction between the surface of the plunger and the barrel and notch surface, is a pre-determined force, inasmuch as it is made of such amount that it is impossible to prevent the handle and attached parts from continuing to move nearly to the end of the stroke, thereby necessarily making the contact quickly and firmly. The elements of habit, carelessness or ignorance therefore, are eliminated as a factor to be considered in the operation of the device, and whenever the plunger and notch are disengaged by pulling the handle with the required force, the switch-member must be carried into the starting position and the connections made in the desired advantageous manner. The handle is held in this starting position manually until the motor has attained the required speed, whereupon it is pushed over in the usual manner into "running" position; the momentum of the parts acquired in so doing, serving to assist in the disengagement of the plunger from the notch in passing each other, as will be readily understood.

The lower end of the handle is provided with a lug 52 which, when the said handle is in "running" position, is adapted to engage a lug 53 which normally lies in the path of lug 52. Lug 53 is formed upon an offset arm 54, Fig. 1, forming part of a lever 55 having a weight 56 forming part thereof and so disposed as to tend to keep arm 45 in its elevated or normal position, as shown in full lines in Fig. 1. The said lever is mounted in a housing 57 of inverted U-shaped cross-section and which forms an integral part of the casing-member 1. Lugs 58, 58, are formed on the top of said lever upon opposite sides of its fulcrum pin 59 and by contact with the housing 57, limit the lever's oscillatory path. The engagement of lugs 53 and 52, therefore, locks the handle and hence the switch-member in the "running" position.

In the illustrated device, means are, as is usual, provided for automatically disconnecting the handle-locking means whenever the current-supply is for any reason cut off. The means illustrated consist of the usual solenoid coil 60 which is suitably connected by means of conductors 60ª with the circuit, as shown in Figs. 6 and 7, and a core 61 which when current is flowing through the coil, is held suspended within the latter. When current ceases to flow, the core drops upon the end of lever 55, as shown in dotted lines in Fig. 1, disengages the latter from the handle and permits the rear spring 16 to return the switch-member and handle to the "off" position. When this action takes place the handle passes somewhat beyond the central position, as shown in dotted lines in Fig. 1ª, as a result of the free play in the notch 46 which is provided for the plunger while engaging same. This permits the contact-pieces 11 to be removed a maximum distance from contact-pieces 39 and thus makes for certainty in destroying any arcing between same, as will be readily understood.

Having fully described my invention, what I claim and desire to secure by Letters Patent is:—

1. In a motor starter, the combination of a suitable casing; an oscillatory switch member within said casing and having a laterally extending stub axle projecting from said casing; a handle secured to said axle; a yielding plunger mounted upon said handle; a notched member secured to said casing and coöperating with said plunger to hold said switch member in a non-engaging position with reference to said contact member; and spring-means mounted so as to resist the movement of said handle in both directions of oscillation, said means tending to normally impart to said switch member said non-engaging position.

2. In a motor-starter, the combination with an oscillatory switch-member; of two holding members coöperating to retain the latter in a given position, one of such members being secured to said switch-member and the other being stationary; said two members consisting respectively of a plate having a notch formed therein; a plunger capable of yielding relatively to said notch; said notch and plunger being formed with coöperating relatively inclined surfaces whereby the engagement of the latter will effect the disengagement of said notch and plunger; and spring means tending to impart to said oscillatory switch member a normally intermediate "off" position, said means adapted to resist oscillation in both directions from said position.

3. In a motor starter, the combination of an oscillatory switch-member; two terminals with which such member may be thrown into contact respectively; a fuse in the circuit established by said switch member; two circuit members capable of connection and disconnection and also connected with said circuit; said switch member being adapted to form contact between said two circuit members when engaging one of said contact members and to disestablish such contact when the other of said contact members is engaged by such switch member; said circuit members adapted to short circuit said fuse.

4. In a motor-starter, the combination of a set of starting terminals; a set of running terminals; a transformer; a movable switch-member, connections and contact-members adapted to connect said starting terminals and transformer in series when said member is in one position and to connect such running terminals and cut out said transformer when in another position; a fuse interposed between said starting terminals and the contact on said switch-member; and a short-circuit interposed between said terminals and contact and around said fuse; said movable switch-member adapted to break said short-circuit when said member is thrown into that position in which said transformer is cut out.

5. In a motor-starter, the combination of a main casing member and a cover member; a transformer in the bottom of said main casing member; complementary bearing portions formed in the contiguous edge portions of said main casing and cover members; axles mounted in the bearings formed by said bearing portions; a switch-member mounted upon said axles; and suitable contact-members and connections for introducing said transformer into or cutting same out of a circuit upon movement of said switch-member.

6. In a motor-starter, a support consisting of a block formed with a plurality of depressions whereby a succession of alternately occurring depressions and elevations are formed; in combination with devices for securing a conductor terminal; each depression and each elevation being provided with one of said devices.

Signed by me, this 19th day of December, 1913.

JOHN C. LINCOLN.

Attented by—
 HERMAN EISELE,
 DOROTHEA FINDLING.

Copies of this patent may be obtained for five cents each, by addressing the "Commissioner of Patents, Washington, D. C."